United States Patent [19]

Keller

[11] 4,037,271
[45] July 19, 1977

[54] SWITCHING REGULATOR POWER SUPPLY

[75] Inventor: Richard A. Keller, Palo Alto, Calif.

[73] Assignee: Boschert Associates, Sunnyvale, Calif.

[21] Appl. No.: 747,229

[22] Filed: Dec. 3, 1976

[51] Int. Cl.$^2$ .......................................... H02M 3/335
[52] U.S. Cl. ........................................ 363/21; 363/80
[58] Field of Search .................... 321/2, 18, 19, 43, 44

[56] References Cited

U.S. PATENT DOCUMENTS

| 3,373,341 | 3/1968 | Wattson | 321/18 X |
| 3,417,306 | 12/1968 | Knak | 321/2 X |
| 3,621,372 | 11/1971 | Paine | 321/2 X |
| 3,771,040 | 11/1973 | Fletcher et al. | 321/2 |
| 3,959,711 | 5/1976 | Greenhalgh | 321/2 X |

*Primary Examiner*—William M. Shoop
*Attorney, Agent, or Firm*—Linval B. Castle

[57] ABSTRACT

A switching regulator electronic power supply for 115 volt A.C. operation rectifies and filters to provide approximately 170 volts of unregulated D.C. to the primary winding of a power conversion transformer. In series with the primary winding is a transistor power switch controlled by a pulse width modulator whose ON-time is determined by the rectified D.C. voltage level, and whose OFF-time is controlled by an output voltage sensor and a current limiter that provide duty cycles that assure a constant D.C. voltage level from the rectified and filtered output of the power supply.

7 Claims, 3 Drawing Figures

SWITCHING REGULATOR POWER SUPPLY

BACKGROUND OF THE INVENTION

This invention relates to electronic power supplies, and more particularly to small light-weight switching regulator supplies for relatively low power requirements.

Most of the present day electronic systems are comprised of assemblies of various integrated circuits requiring but very moderate amounts of well-regulated electrical power. A total system of integrated circuit subassemblies may require only one or two amperes of a low level regulated voltage and it has been estimated that ninety percent of all electronic subsystems that include a power supply require less than 30 watts of regulated D.C. power.

Until quite recently, nearly all commercially available commercial power supplies operated by transforming and rectifying the A.C. power to a voltage somewhat higher than the desired regulated voltage and then by a process that required the dissipation of substantial amounts of power, provide the necessary regulation to assure constant output voltage levels regardless of variations in the load or the input line voltage. While such regulated power supplies operated quite effectively, they were very inefficient and the power dissipation produced substantial amounts of heat requiring the extensive use of heat sinks and other cooling devices to avoid the excessively high operating temperatures that would seriously degrade the reliability of the power supply.

Recently, power supply development is being concentrated toward the high efficiency switching regulators which dissipate a minimum of electrical power and therefore obviate the need for complex cooling schemes and devices. Switching regulators are generally voltage regulating circuits which sample the regulator output voltage, compare it with a voltage reference, and use the error voltage to control an electronic switch in line between the unregulated D.C. source and filtering circuitry which smooths out the interruptions caused by the switching action into a constant D.C. voltage at a level determined by the reference voltage level. In order to properly regulate between no-load and a maximum load, it is apparent that the in-line electronic switch continually oscillates to produce a minimum of ON-time at no-load to a maximum of ON-time at maximum load. Because this random switching greatly complicates the circuit design, nearly all switching regulators now drive the in-line switches with circuits containing oscillators that either operate at a fixed frequency and vary the pulse width or, alternately, provide constant pulse widths and vary the pulse frequency for applying the unregulated D.C. voltage to the filter circuitry.

SUMMARY OF THE INVENTION

In the regulated power supply of the present invention, the A.C. input power is not transformed but is applied directly to a bridge rectifier. The positive D.C. voltage line from the rectifier is coupled to one terminal of a transformer primary winding, the other terminal of which is coupled through an in-line transistor and a current limiter circuit and back to the negative side of the bridge rectifier. The switch is controlled by an oscillating pulse-width modulator that produces a square wave output, the ON-time of which is determined only by the amplitude of the unregulated D.C. voltage across the bridge rectifier. The OFF-time of the pulse width modulator is independent of the unregulated D.C. voltage level but varies with load, and is controlled by signals from the current limiter circuit and also from an opto-isolator driven by the error signal from a comparator that measures the rectified output voltage on the secondary of the transformer against a reference voltage.

BRIEF DESCRIPTION OF THE DRAWINGS

In the drawings which illustrate a preferred embodiment of the invention.

DETAILED DESCRIPTION OF THE PREFERRED EMBODIMENT

Figure 1:
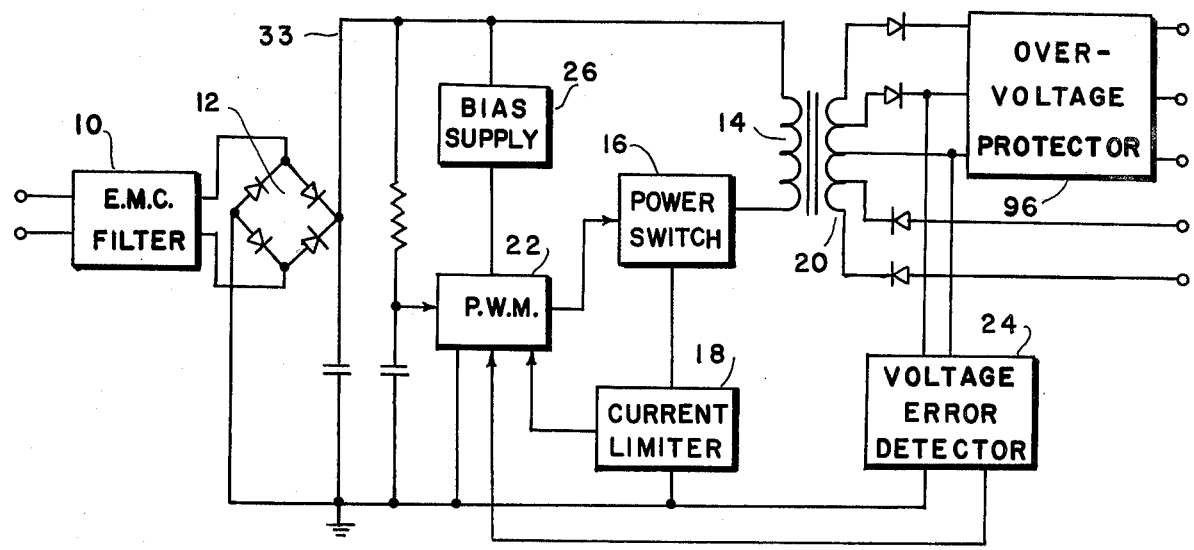
FIG. 1 is a block diagram of the switching regulator power supply of the invention.

The preferred embodiment of the switching regulator power supply converts electrical power at conventional single phase voltages and conventional distribution frequencies into regulated output voltages of 5 and 15 volts, both negative and positive, at 30 watts. As illustrated in the simplified block diagram of FIG. 1, power is applied to the circuitry through a conventional E.M.C. filter 10 containing balanced windings on a common core for rejecting electrical noise spikes that may be induced into the power lines. The output of the filter 10 is then applied to a bridge rectifier circuit 12 which converts the input voltage to D.C. at a level in the order of approximately 170 volts. The direct current is applied to the primary winding 14 of a power conversion transformer and the D.C. circuit is completed through a power switch 16 and a current limiter 18.

The function of the power switch 16 is to break the circuit through the transformer primary winding 14 at a controlled rate so that the power induced into the secondary windings 20 will, when properly rectified and filtered, produce D.C. output voltages that are regulated to a predetermined level regardless of the power supply load or variations in input voltage or frequency. The power switch 16 is controlled by a pulse-width modulator 22 which is controlled by the feedback loop comprising the current limiter 18 and a voltage error detector 24. Detector 24 samples one of the output voltage terminals of the power supply, compares that voltage level with a voltage reference, and produces a difference or error signal that aids in determining the OFF-time of the pulse width modulator 22. The ON-time of modulator 22 is determined by the amplitude of the unregulated D.C. voltage as measured across the output of the bridge rectifier 12. Since the ON-time of modulator 22 varies inversely with the D.C. input voltage, and the OFF-time is varied to compensate for regulation errors due to voltage drops in the output circuitry, both pulse width and pulse frequency are permitted to vary, a condition which normally creates circuit design problems, as previously explained. However, it has been found that by eliminating the normally used input power transformer and by applying a full high D.C. voltage to the transformer primary winding 14, the duty cycle of operation of the modulator 22 and power switch 16 during the continuous current mode of operation (maximum normal load) produces a situation in which the ON-time of the modulator 22 is much shorter than the OFF-time; hence, the ultrasonic pulse frequency can be held relatively constant over a wide range of input voltages and loading conditions, thereby simplifying the design problems.

Figure 2:
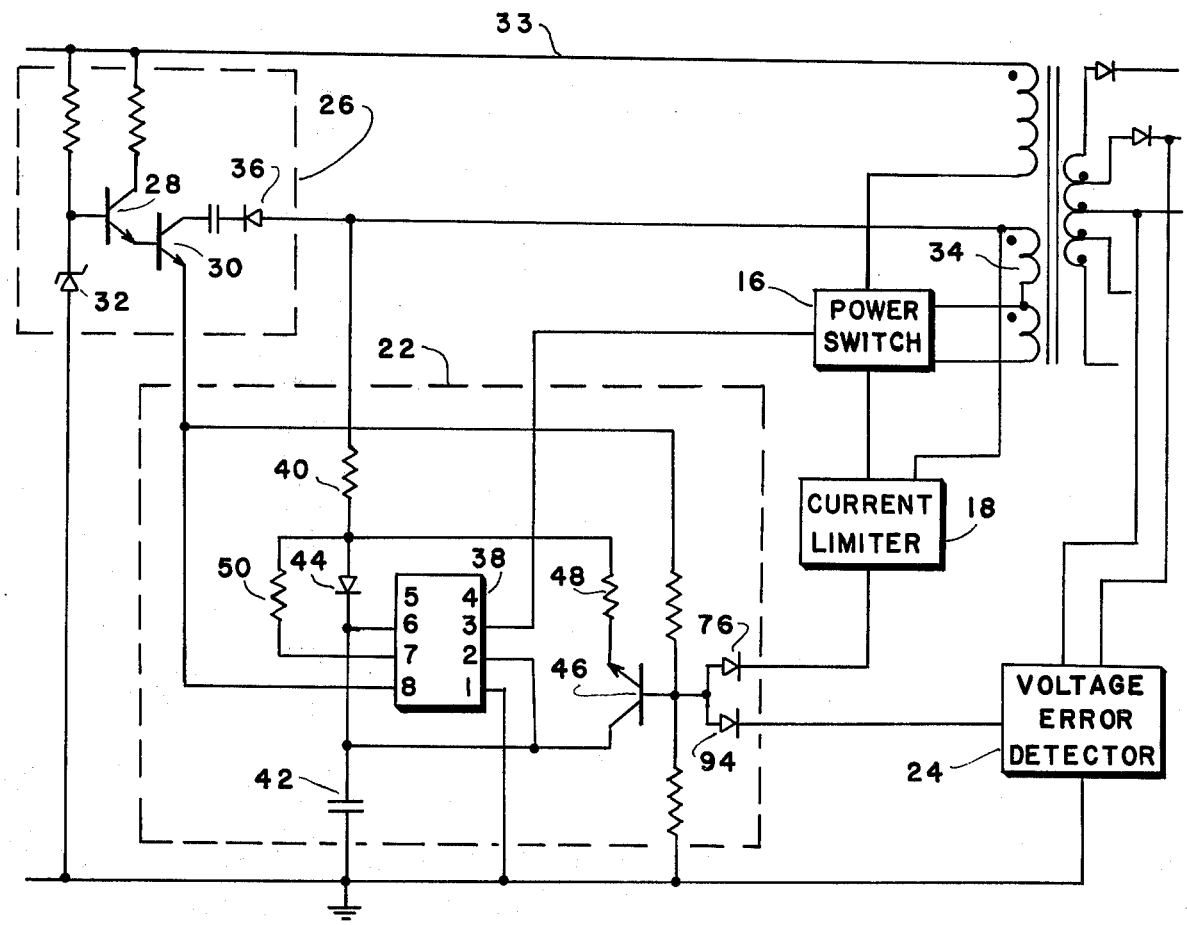
FIG. 2 is a diagram illustrating, in schematic form, the details of the bias supply circuitry and the pulse width modulator circuitry.

FIG. 2 is a partial block diagram containing a detailed schematic diagram of the pulse width modulator 22 and its accompanying bias supply 26, which is a linear regulator providing the power to start and run the modulator 22. As illustrated in FIG. 2, the bias supply includes transistors 28 and 30 connected in a Darlington configuration with the base of transistor 28 clamped at 10 volts by the Zener diode 32 that is connected between ground potential through a high resistance to the high voltage unregulated D.C. line 33. The collector of transistor 30 receives its power from an auxiliary winding 34 on the power conversion transformer. While the primary winding 14 of the transformer contains approximately 85 turns, the auxiliary winding 34 contains but six turns of wire and the signal generated thereby is applied to the bias supply 26 and through a rectifying diode 36 to the collector of transistor 30. The D.C. voltage level appearing on the collector of transistor 30 is in the order of 16 volts and the regulation provided under the control of transistor 28 produces a D.C. regulated voltage at a level of approximately 9 volts at the emitter of transistor 30.

The pulse width modulator 22, schematically illustrated in FIG. 2, includes a type 555 integrated circuit timer, a well-known and commonly used component produced by most integrated circuit manufacturers, such as Fairchild Camera and Instrument Company. The regulated 9-volt D.C. level from the bias supply 26 is applied to pin 8 of the timer 38 to provide power thereto. Within the timer 38 is a flip-flop that switches to a high output whenever a signal applied to terminal 2 of the timer drops below one-third of the supply voltage applied to terminal 8, and switches to a low state whenever the signal applied to terminal 6 of the timer exceeds two-thirds of the voltage applied to terminal 8. Furthermore, a transistor switch within the timer grounds terminal 7 concurrently with the switching off of the flip-flop.

In the illustrated embodiment, whenever the voltage level on terminal 2 of the timer drops below 3 volts, the output signal at terminal 3 will switch to a high state. Whenever the voltage applied to terminal 6 of the timer exceeds 6 volts, the signal at the output terminal 3 will drop and terminal 7 will be grounded within the timer 38. Terminals 2 and 6 of the timer 38 are connected together and to the RC timing circuit comprising a 1 megohm resistor 40 and a 270 Pf. capacitor 42. One end of resistance 40 is coupled to the unregulated high voltage D.C. line 33 while the other end is connected through a forward biased diode 44 to one side of the capacitance 42, the other end of which is at ground potential. Current flow through the resistance 40 will charge the capacitance 42 until the voltage level appearing on terminal 6 of the timer 38 reaches 6 volts. At that point, the flip-flop within the timer 38 switches to its low state and grounds terminal 7. The diode 44 prevents the capacitor 42 from discharging directly into terminal 7. Therefore, the discharge must take place through transistor 46, the collector of which is connected to terminals 2 and 6 of the timer 38, and the emitter of which is connected through a 24K resistance 48 and a 5K resistance 50 to terminal 7 of the timer 38 and thence to ground through terminal 1. The discharge rate of the capacitor 42 is therefore determined by the conduction through transistor 46 and when the charge on capacitor 42, and hence the voltage on the trigger terminal 2 of the timer drops below 3 volts, the terminal 7 of the timer is lifted from ground and the output terminal 3 again switches to its high state. It can be seen, therefore, that the timer 38 produces a high output signal, the duration of which is determined solely by the voltage level of the unregulated D.C. line 33, while the duration of the low output state of the timer is determined solely by the conduction through the circuit including the NPN transistor 46.

The base of transistor 46 is biased so that the power supply output to a full load will result in a pulse width modulator timing in which the OFF-time (the discharging time of capacitor 42 through the transistor 46) is about four times the modulator ON-time (charging of capacitor 42 through the resistor 40). Variations in the OFF-time of the duty cycle of the modulator are then determined by external signals applied to the base of transistor 46. Any externally applied signals that lower the voltage at the base of the transistor reduces conduction of the transistor, increases the OFF-time of the modulator, and results in a lower output voltage of the power supply.

Figure 3:
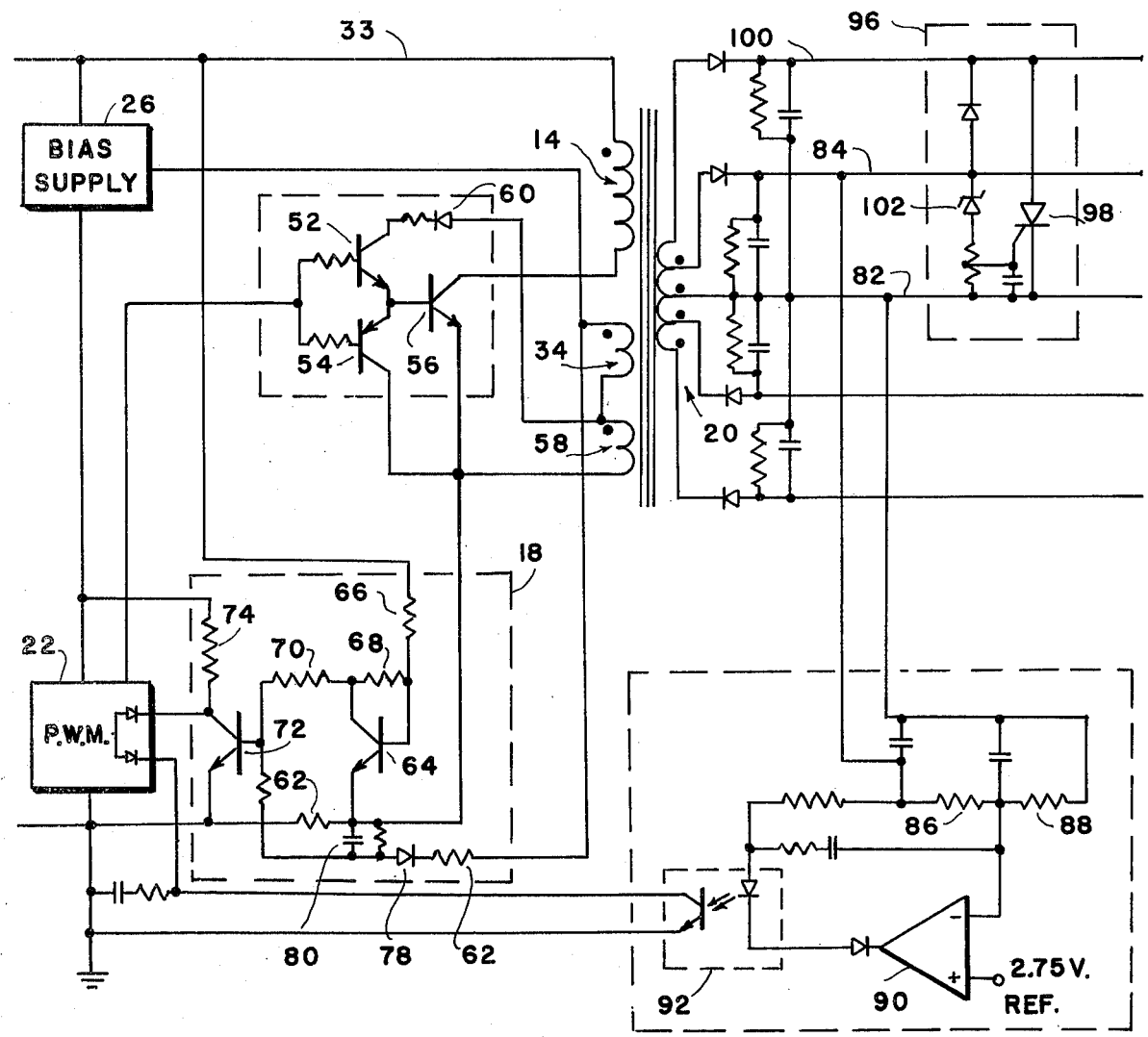
FIG. 3 is a schematic diagram of the details of the power switch, current limiter, over-voltage protector, and voltage error detector.

As illustrated in FIG. 3, the output of the pulse width modulator 22 is applied to the power switch 16 and through resistances to the bases of an NPN transistor 52 and a PNP transistor 54. The emitter of transistor 52 is connected to the emitter of transistor 54 and to the base of the transistor power switch 56. Transistors 52 and 54 receive their power from an auxiliary winding 58 of only two turns of wire on the power converting transformer. One end of the winding is connected through a rectifying diode 60 and a current limiting resistor to the collector of transistor 52, while the other end of the winding 58 is coupled directly to the collector of transistor 54 and to the emitter of transistor 56. Therefore, the high or ON-time pulse from the modulator 22 will enable the transistor 52 which raises the base potential on the switching transistor 56 to render it conductive. The negative, or OFF-time pulse from the modulator 22 will disable the NPN transistor 52 while enabling the transistor 54 which cuts off conduction of current through the switching transistor 56 and the primary winding 14.

The emitter of the switching transistor 56 in the power switch 16 is coupled through the current limiter 18 to ground. As shown in FIG. 3, the circuit from the power switch 16 to ground reference includes a resistance 62 which has a value of 0.10 ohms. Connected to the power switch side of the resistance 62 is the emitter of an NPN transistor 64, the base of which is connected through a 180K resistor 66 to the unregulated high-voltage D.C. line 33. The base of the transistor 64 is also connected to one terminal of the resistance 68, the other terminal of which is connected to the collector of the transistor 64 and also to one terminal of a 620 ohm resistance 70, the other terminal of which is connected to the base of an NPN transistor 72. The emitter of transistor 72 is connected to ground and the collector is connected through a 10K resistance 74 to the regulated 9-volt output of bias supply 26.

The current limiter 18 incorporates a peak detecting type of circuit that monitors the current flowing through the power switch. When the current exceeds the preset level of approximately 2½ amperes, the voltage drop across the resistance 62 will equal the drop across the resistances 68 and 70, resulting in the initiation of a current flow through the collector of the transistor 72 and the consequent lowering of the collector voltage and conduction through the input diode 76 in the pulse width modulator 22. As previously described, current conduction through the diode 76 will lower the voltage on the base of transistor 46 in the pulse width modulator 22, as shown in FIG. 2, and will increase the OFF-time of the modulator and the power switch 16 to reduce the output voltage of the power supply.

As shown in FIG. 3, the current limiter 18 also samples the voltage on the winding 34 of the power conversion transformer. The voltage monitored on the transformer winding 34, when rectified by the rectifying diode 78, is proportional to the output voltage of the power supply. This rectified voltage is filtered by capacitor 80 and applied through a 6.8K resistor to the base of the transistor 72 to control its conduction. This supply thereby provides the fold-back characteristics necessary to limit the current.

The secondary winding 20 of the power conversion transformer is a multitapped winding containing a neutral tap 82, negative and positive 5-volt windings of 12 turns each, and negative and positive 15-volt windings of 32 turns each from the neutral tap. The positive output taps are connected to the anodes of suitable rectifying diodes and the negative taps to the diode cathodes and each output conductor is connected through a suitable large filter capacitor to the neutral line 82 in the conventional manner.

As shown in FIG. 3, a voltage error detector 24 samples the voltage between the neutral conductor 82 and the positive 5-volt conductor 84. The 5-volt signal is introduced into the error detector 24 into a voltage divider comprising resistors 86 and 88 in series across the 5-volt output conductor 84 and the neutral tap 82. The junction of resistors 86 and 88 is applied to the input terminal of a linear amplifier 90 which compares the input voltage against a 2.75 volt internal reference to produce an output signal proportional to the difference in voltages. This difference voltage is applied to the light emitting diode of an opto-isolator 92 containing a light-sensitive transistor element which is rendered conductive by an amount proportional to the intensity of the light from the L.E.D. The emitter of the transistor is connected to ground while the collector is coupled to input diode 94 in the pulse width modulator 22.

The voltage error detector 24 therefore monitors the output voltage of the power supply. If the 5-volt output conductor 84 begins to rise above the 5-volt level, the linear amplifier 90 will sense the greater difference in voltage and will increase its output to intensify the light from the opto-isolator diode, thereby bringing the cathode of diode 94 closer to ground potential to lower the voltage on the base of transistor 46 which, as previously explained, alters the duty cycle of modulator 22 by increasing the Off-time to lower the output voltage.

The preferred embodiment of the switching regulator power supply includes an over-voltage protector 96 which, as shown in the schematic diagram of FIG. 3, includes a silicon controlled rectifier 98 coupled between positive 15-volt conductor 100 and the neutral conductor 82. A Zener diode 102 connected in series with a resistance between the 5-volt conductor 84 and the neutral conductor 82 is selected so that it will not conduct below a pre-selected over-voltage of perhaps 5.5 volts. If the voltage on the 5-volt line 84 exceeds the Zener value, it will conduct to gate the S.C.R. 98 which will short out the 15-volt line 100 with the neutral line 82. This will, of course, draw a large current which will be instantly detected by the current limiter which will rapidly alter the duty cycle of the pulse width modulator 22 to increase the OFF-time, thereby lowering the output voltage until power is disconnected and reapplied to the circuit.

What is claimed is:

1. A switching regulator power supply for converting electrical power at an unregulated voltage into regulated D.C. at desired voltage levels, said supply comprising:

rectifying means coupled to receive the electrical power for rectifying said power to produce an unregulated D.C. voltage and a ground reference;

a power conversion transformer having a primary winding and a center-tapped secondary winding, the first end of said primary winding being coupled to the unregulated D.C. voltage output of said rectifying means;

electrical switching means coupled between the second end of said primary winding and said ground reference; and a pulse-width modulator coupled between said unregulated D.C. voltage and ground reference and coupled to control the operation of said electrical switching means, said pulse-width modulator including an oscillator having a duty cycle, the ON-time of which is determined by amplitude of said unregulated D.C. voltage and the OFF-time of which is substantially longer than that of the said ON-time.

2. The power supply claimed in claim 1 wherein said pulse width modulator includes:

a series RC circuit coupled between said unregulated D.C. voltage and ground reference;

circuitry including a flip-flop responsive to the charge on the capacitance in said RC circuit for producing an output signal when said charge falls below a first predetermined value and for producing no output signal when said charge exceeds a second predetermined value; and capacitor discharge control circuitry including a duty cycle transistor in series between said charged capacitor and ground reference for varying the discharge rate of said charged capacitor and the OFF-time of said modulator.

3. The power supply claimed in claim 2 further including rectifying and filtering across the secondary winding of said power conversion transformer for smoothing the pulses induced into said secondary winding into a D.C. power supply output.

4. The power supply claimed in claim 3 including an output voltage error detector coupled to monitor the voltage level of said D.C. power supply output, said error detector comprising:

comparison circuitry for comparing said output voltage level with an internal reference voltage and for producing an output error voltage that varies with the difference in amplitude between said compared voltages;

an opto-isolator having a light emitting diode controlled by said error voltage and a semiconductor element, the conduction of which varies with the intensity of said light emitting diode, said element being coupled between the base of said duty cycle transistor and ground reference for varying the conduction of said duty cycle transistor and the OFF-time of said pulse-width modulator inversely with variations in said power supply output voltage level.

5. The power supply claimed in claim 3 including current limiting circuitry interposed between said electrical switching means and ground potential for monitoring current flow through said primary winding, said limiting circuitry including a control transistor coupled to the base of said duty cycle transistor and responsive to current flow through said limiting circuitry for varying the conduction of said duty cycle transistor inversely with variations in current flow.

6. The power supply claimed in claim 5 wherein said current limiting circuitry includes a voltage monitoring circuit coupled between a secondary winding on said power conversion transformer and the base of said control transistor, said monitoring circuit including a rectifier and filter for converting the voltage pulses on said secondary winding into a smooth D.C. that varies conduction of said control transistor with variations in the monitored voltage.

7. The power supply claimed in claim 6 including an over-voltage protection circuit between the neutral center tap and a power supply output conductor in the secondary circuit of said power conversion transformer, said protection circuit including a Zener diode having a breakdown voltage at the desired over-voltage level and a silicon controlled rectifier connected to short circuit said secondary circuit, the gate element of said silicon controlled rectifier coupled to said Zener diode for gating on said rectifier with the breakdown of said Zener diode.

* * * * *